(12) United States Patent
Otto et al.

(10) Patent No.: US 8,928,862 B2
(45) Date of Patent: Jan. 6, 2015

(54) DEVICE AND METHOD FOR NON-CONTACTING MEASUREMENT OF A DISTANCE AND/OR PROFILE

(75) Inventors: Tobias Otto, Dresden (DE); Peter Meja, Dresden (DE); Torsten Stautmeister, Dresden-Langebrück (DE)

(73) Assignee: Micro-Epsilon Optronic GmbH, Dresden-Langebruck (DE)

( * ) Notice: Subject to any disclaimer, the term of this patent is extended or adjusted under 35 U.S.C. 154(b) by 146 days.

(21) Appl. No.: 13/146,168

(22) PCT Filed: Jan. 27, 2010

(86) PCT No.: PCT/DE2010/000081
§ 371 (c)(1),
(2), (4) Date: Sep. 7, 2011

(87) PCT Pub. No.: WO2010/085940
PCT Pub. Date: Aug. 5, 2010

(65) Prior Publication Data
US 2012/0038900 A1    Feb. 16, 2012

(30) Foreign Application Priority Data

Jan. 27, 2009  (DE) .......................... 10 2009 006 323

(51) Int. Cl.
*G01C 3/00* (2006.01)
*G01S 17/89* (2006.01)
*G01S 7/497* (2006.01)
*G01S 17/48* (2006.01)
*G01S 7/481* (2006.01)

(52) U.S. Cl.
CPC .............. *G01S 17/89* (2013.01); *G01S 7/4972* (2013.01); *G01S 17/48* (2013.01); *G01S 7/481* (2013.01)
USPC .............................. 356/3; 356/3.01; 356/3.05

(58) Field of Classification Search
CPC ......... G01S 17/89; G01S 17/48; G01S 7/481; G01S 7/4972

USPC .................. 356/3, 3.01, 3.05, 3.1, 4.07, 4.08, 356/601–612; 250/221, 216, 492.1, 492.2; 359/741, 212, 742

See application file for complete search history.

(56) References Cited

U.S. PATENT DOCUMENTS 4,613,207 A * 9/1986 Fergason ........................... 349/5
4,859,054 A * 8/1989 Harrison ...................... 356/5.06
(Continued)

FOREIGN PATENT DOCUMENTS

EP    1 760 509    3/2007

OTHER PUBLICATIONS

International Preliminary Report on Patentability for International Application No. PCT/DE2010/000081 dated Aug. 2, 2011.

(Continued)

*Primary Examiner* — Sang Nguyen
(74) *Attorney, Agent, or Firm* — Alston & Bird LLP

(57) ABSTRACT

The invention relates to a device (1) for non-contacting measuring of a distance and/or a profile of a measured object (9), a light source (2) generating an illuminating light beam for illuminating the measured object (9), and a detector (11) being provided for detecting the reflected portion of the illuminating light beam at the measured object (9), characterized with regard to a potentially robust and nevertheless compact sensor construction in that a first optic (13) and a second optic are disposed in the beam path of the illuminating light beam, wherein the illuminating light beam can first be expanded in an expansion plane parallel to the diffusion direction by means of the first optic (13), and then made nearly parallel by means of the second optic. In a particularly preferable embodiment, the second optic is formed by a Fresnel lens (5). A corresponding method is disclosed.

11 Claims, 2 Drawing Sheets

(56) References Cited

U.S. PATENT DOCUMENTS

| | | | |
|---|---|---|---|
| 4,872,757 A * | 10/1989 | Cormack et al. | 356/612 |
| 5,072,128 A * | 12/1991 | Hayano et al. | 250/559.18 |
| 5,130,531 A * | 7/1992 | Ito et al. | 250/216 |
| 5,235,467 A | 8/1993 | Nagamachi | |
| 5,255,116 A | 10/1993 | Araki et al. | |
| 5,294,980 A * | 3/1994 | Matsugu et al. | 356/401 |
| 5,473,426 A * | 12/1995 | Hayano et al. | 356/237.2 |
| 5,627,689 A * | 5/1997 | Fujinawa et al. | 359/858 |
| 5,640,284 A * | 6/1997 | Tanitsu et al. | 359/869 |
| 6,154,278 A * | 11/2000 | Ito et al. | 356/499 |
| 6,650,916 B2 * | 11/2003 | Cook et al. | 600/322 |
| 7,133,140 B2 * | 11/2006 | Lukacs et al. | 356/612 |
| 7,626,400 B2 * | 12/2009 | Holbrook et al. | 324/642 |
| 7,655,896 B2 * | 2/2010 | Asper et al. | 250/221 |
| 8,045,175 B2 * | 10/2011 | De Groot et al. | 356/497 |
| 2004/0066515 A1 * | 4/2004 | Ott | 356/418 |
| 2007/0181810 A1 | 8/2007 | Tan et al. | |
| 2008/0116359 A1 | 5/2008 | Asper et al. | |
| 2008/0117531 A1 | 5/2008 | Asper et al. | |
| 2009/0009767 A1 * | 1/2009 | Boege et al. | 356/417 |
| 2012/0081408 A1 * | 4/2012 | Chiang | 345/690 |

OTHER PUBLICATIONS

International Search Report for International Application No. PCT/DE2010/000081.

* cited by examiner

DEVICE AND METHOD FOR NON-CONTACTING MEASUREMENT OF A DISTANCE AND/OR PROFILE

BACKGROUND OF THE INVENTION

1. Field of the Invention

The invention relates to a device for non-contacting measurement of a distance and/or of a profile of a measured object, whereby a light source generates an illumination light beam to illuminate the measured object and whereby a detector is provided for detection of the reflected portion of the illumination light beam at the measured object. The invention also relates to a corresponding method.

2. Description of Related Art

Devices of this type for non-contacting measurement of a distance and/or of a profile have been known for a long time from practice. In this process, a light source generates an illumination light beam that has been prepared by means of an optics. The illumination light beam is directed to a measured object and illuminates the measured object in the form of points. Portions of the illumination light beam reflected on the measured object are detected by a detection device of the sensor and from this a conclusion is made regarding the distance of the measured object from the sensor.

Very frequently sensors of this type work according to the triangulation principle. In this case, the illuminated point of the detector array changes due to the reflected portion of the illumination light beam depending on the distance of the measured object from the sensor. For determining the distance, a relationship is produced between the illuminated detector element and the distance of the measured object. In principle, this can also be calculated from the sensor geometry. However, usually calibration measurements are performed and the correlation between distance and illuminated spot are stored.

To improve the sensitivity of the sensor devices, giving the illumination light beam a slight linear expansion is known. Line lengths in the range from 2 to 3 mm are usual. This takes into account the fact that frequently detector arrays with rectangular detector elements are used. For spot-shaped illumination, usually the entire available surface of the detector elements is not used, but only a part of the elements are illuminated. The illuminated surface of a detector element can be increased by forming the illumination line and by suitable adaptation of the sensor device. Because of this, the sensitivity of the entire sensor device can be increased.

A sensor of this type is known from DE 10 2007 050 097 A1. This has a structured front disc that expands a bundled light beam generated by a light source in at least one direction. A first lens focuses the light beam emitted from the light source. The front disk, with several optical elements, is arranged between the lens and its focal point turned away from the light source. This generates a narrow, approximately parallel illumination light beam. Various possible implementations are named as optical elements, e.g. cylinder or spherical lenses, lens sections thereof, for example with Fresnel lenses, or aperture or grid structures. By mounting the optical elements on the front disk, the effort for calibrating the light source, optics and housing with respect to each other is reduced.

A very similar sensor structure is shown in DE 10 2007 050 096 A1. In addition, means are used to homogenize the light beam.

What is disadvantageous in these designs is that the optical characteristics of the sensor are not independent of mechanical stresses on the sensor. If the comparatively large front disk is mechanically stressed, it deforms and the optical characteristics of the sensor change. It is also problematic that with a defective front disk, after it is replaced new calibration measurements are necessary since the optical characteristics of the new front disk are not identical to those of the previously used front disk. Thus, the costs of operation increase.

For determining a profile of the measured object, multidimensional information regarding the measured object must be available. For this purpose, usually the triangulation sensor or the measured object is moved and the measured object is scanned in succession. In this case, the illumination light beam is generally moved in a meandering pattern over the measured object. The disadvantage here is that the scanning process is very time-consuming and because of this it is unsuitable in many application areas, for example during the measurement of profiles of vehicle tires.

Other solutions use an illumination light beam that illuminates the measured object in a linear shape. To prevent a bulky and heavy sensor optics, usually a divergent illumination light beam is used. With highly structured measured objects, however, this leads to shadowing of individual areas on the measured object, which means that no reliable measurement of these measured objects is possible. Another system, like the sensor described in DE 10 2007 050 097 A1, could in fact be adapted to a two-dimensional measurement of a measured object by elongating the illumination line, but because of this, very large optics would result. In addition, an approximately uniform intensity of the illumination along the illumination line can only be implemented with great effort, for example the use of means for homogenizing the light beam.

Therefore, the present invention is based on the object of indicating a compact sensor device that can be used in many ways, by means of which a reliable two-dimensional measurement of a measured object is made possible. A corresponding method will be indicated.

SUMMARY OF VARIOUS EMBODIMENTS

According to the invention, the object above is achieved by the various device embodiments described herein. According to this, the device being discussed is characterized in that in the beam path of the illumination light beam, a first optics and a second optics are arranged, whereby the illumination light beam can be fanned by means of the first optics in a fanning plane arranged parallel to the propagation direction and after that can be approximately parallelized by the second optics.

With regard to the method, the previously mentioned object is achieved by the various method embodiments described herein. According to this, the method being discussed is characterized in that the measured object is illuminated in a linear manner with the use of a first optics and a second optics in the beam path of the illumination light beam, whereby the illumination light beam can be fanned in a fanning plane arranged parallel to the propagation direction by means of the first optics and whereby the illuminated light, after fanning, is approximately parallelized by the second optics.

In an inventive manner, it is first recognized that the previously named and opposing problems can be solved using comparatively simple measures. For this purpose, first the light beam generated by a light source is fanned in a fanning plane by means of the first optics, whereby the fanning plane is arranged parallel to the propagation direction of the illumination light beam. In this case, the propagation direction in the area of the optics is meant in which the fanning takes place. It is significant for the invention that the fanning is limited essentially to one spatial direction, i.e. that the light beam is not significantly expanded in several spatial directions. Thus the fanning is limited essentially in directions parallel to the fanning plane, while in directions perpendicular to the fanning plane practically no fanning takes place. After that, the light beam fanned in this way arrives as narrow strips on a second optics, by means of which the light beams are made approximately parallel. Because of the prior fanning in one fanning plane, the second optics can be designed so that it is very narrow. The almost parallel light beams produced in this way leave the sensor device and are deflected as an illumination light beam to the measured object. Because of this combination of a first and second optics, illumination line lengths in the range of several centimeters can be achieved. This means that the device according to the invention is especially suitable for arrangements with a short distance to the measuring field.

By the use of an approximately parallel illumination light beam, shadowing effects on a structured surface of the measured object can be decreased. A largely uniform illumination can be achieved. Homogenization of the illumination light beam is not necessary. Because of the parallel light guidance—caused by an almost constant incident light angle on the surface of a measured object over the entire line length—a uniform back scatter distribution can also be achieved. Because of the use of the narrow second optics, a considerable miniaturization and weight savings can be achieved. Still a mechanically stable device can be achieved using the measures according to the invention.

The second optics can be formed by various diffractive, refractive or holographic elements. For this purpose, various lenses or lens systems, aperture or grid structures are known from the state of the art. However, in an especially preferred embodiment, the second optics comprises a Fresnel lens or is formed by a Fresnel lens. This contributes to a further weight reduction and miniaturization of the sensor device.

For even further weight reduction, the Fresnel lens can be manufactured of plastic. Various plastics are known from practice that have adequately good optical characteristics.

Preferably the Fresnel lens is designed as a cylindrical Fresnel lens.

Preferably the grading of the Fresnel lens is designed essentially perpendicular to the fanning plane of the illumination light beam. Because of this, it is possible to achieve a situation in which the illumination light beam is only influenced by the Fresnel lens in directions parallel to the fanning plane. However, the grading can be slightly curved so that the Fresnel lens also has a slight influence in directions perpendicular to the fanning plane. Because of this, the radiation characteristics of the sensor device are influenced without simultaneously resulting in a greatly increased calibration effort for the individual components.

For simplification of an adaptation of the sensor device, however, the illumination light beam preferably passes through the second optics essentially unchanged in directions perpendicular to the fanning plane. This results in the advantage that with the use of the first optics and the second optics, the illumination light beam can be adjusted in directions parallel and perpendicular to the fanning plane, independently of each other. Using the first optics, the shape of the illumination light beam can be adjusted in directions perpendicular to the fanning plane, while the radiation characteristics in directions parallel to the fanning plane can be adjusted by the second optics.

In addition, the first optics can consists not only of one individual component but also of two or more components. Because of this, the radiation characteristics can be adjusted in directions perpendicular to the fanning plane by a first component of the first optics (for example, in the form of a slightly converging light beam in directions perpendicular to the fanning plane). A second component of the first optics can ensure a fanning parallel to the fanning plane.

The first optics has a collimator that bundles the light beam leaving the light source. The collimator can ensure the beam shaping in the direction perpendicular to the fanning plane.

The first optics could also have a line-generating optics by means of which a fanning of the illumination light beam is achieved. Preferably the line-generating optics is arranged in the area of a focal point of the Fresnel lens, namely the focal point on the side of the light source.

Because of the use of the collimator and the line-generating optics, a first and a second component of the first optics can be implemented as has already been previously described.

The illumination light beam is directed to a measured object, at least partially reflected there and detected by a detector. The detector has detection optics, which in addition to the classic imaging elements can also consist of a cylindrical lens or a combination of several cylindrical lenses. Diffraction or holographic elements are also possible. What is important is that the optics makes possible an image in which the position of the illuminated image spot on the detector array is independent of the distance of the measured object from the sensor device. In addition to classic imaging elements, the detection optics can comprise a combination of several cylindrical lenses and/or be characterized as a diffractive or holographic element.

In another advantageous manner, an approximately parallelized received beam path is provided in the sensor arrangement, resulting in lower shadowing results with even more consistent reflection geometry.

Preferably the outlet window and the optics are designed completely separately from each other. For this purpose, the optics is arranged at a distance from the outlet window. The optics is effectively protected against damage and soiling by the outlet window. In addition, with the use of an approximately parallel illumination light beam, an approximately perpendicular penetration of the outlet window can be achieved, whereby no other refraction effects occur at the outlet window. Because of this, a deformation of the outlet window has a significantly lower influence on the imaging characteristics.

The entire sensor device is preferably arranged in a housing, whereby the illumination light beam leaves the housing through an outlet window. The portion of the illumination light beam reflected by the measured object can go through an inlet window into the housing. In this process, outlet window and inlet window could be designed as separate windows. In a preferred embodiment, outlet window and inlet window are formed by a common window.

Due to the distribution of the sensor optics in various components, it is largely possible to freely adjust the radiation characteristics of the sensor device. For adaptation of the device, an adaptation of the distance between the first optics and the second optics can be performed. Because of this, the radiation characteristics in directions parallel to the fanning plane change. If the first optics is implemented using two components, a change in the radiation characteristics can also be achieved in directions perpendicular to the fanning plane by a change of the distance of these components. In this way, the total radiation characteristics of the sensor device can be flexibly defined. However, the calibration of the components is comparatively simple by the selection of the individual components that essentially only result in an influence in one direction.

BRIEF DESCRIPTION OF THE SEVERAL VIEWS OF THE DRAWINGS

There are now various possibilities for designing and further developing the teaching of the present invention in an advantageous manner. For this purpose, reference should be made, on the one hand, to the various embodiments described herein and, on the other, to the following explanation of a preferred exemplary embodiment of the invention with the use of the drawing. In connection with the explanation of the preferred exemplary embodiment of the invention using the drawing, preferred designs and further developments of the teaching will also be explained generally. In the drawings.

DETAILED DESCRIPTION

Figure 1:
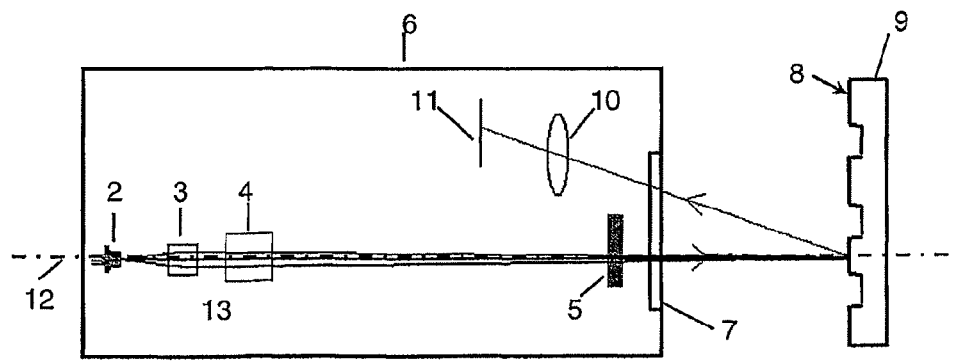
FIG. 1 shows a side view of a sensor device according to the invention.
Figure 2:
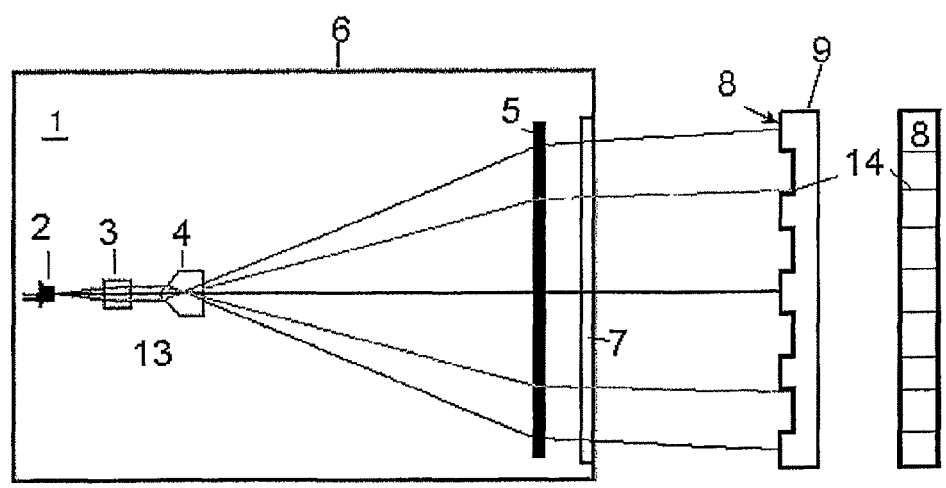
FIG. 2 shows a top view of the sensor device according to FIG. 1

FIG. 1 shows a side view of a sensor device according to the invention. A top view of the sensor device is shown in FIG. 2. In FIG. 2, a cross section along the optical axis of the first optics and the Fresnel lens is shown. In FIG. 1, the optical axis is drawn in as a dotted line with reference number 12.

The device 1 shown in FIGS. 1 and 2 has a light source 2 that generates a light beam. In this exemplary embodiment, the light source 2 is formed by a semiconductor laser. The light beam is focused through a collimator 3 and after that fanned by line-generating optics 4. The fanning occurs parallel to a fanning plane that is parallel to the optical axis 12 of the first optics 13 (consisting of collimator 3 and line-generating optics 4) and the second optics (of a Fresnel lens 5). In FIG. 1, the fanning plane is perpendicular to the drawing plane; in FIG. 2, it coincides with the drawing plane. The fanned light beam is refracted by the Fresnel lens 5 in such a way that an approximately parallel light beam leaves the Fresnel lens 5. The components described are arranged in a housing 6.

The illumination light beam prepared in this way leaves the housing 6 of the sensor device through a window 7 that functions in this design as an outlet and inlet window. The illumination light beam is directed to a surface 8 of a measured object 9 and illuminates the measured object 9 in a linear manner. A portion of the illumination light beam reflected at the surface 8 of the measured object 9 arrives through the window 7 into the housing 6 of the sensor device 1. In this case, the window 7 can be designed using a coating or suitable material selection so that only wavelengths in the range of the spectrum of the illumination light beam can pass through the window. This reduces the sensitivity to outside light.

The portion of the illumination light beam reflected on the surface 8 of the measured object 9 that goes through the window 7 into the housing is prepared by detection optics 10 and deflected to a detector 11. In this case, a detector matrix is used. Depending on the position of the illuminated image spots of the detector matrix, a conclusion is made about the distance to the measured object 9. Due to the linear illumination of the measured object 9, with a structured surface 8 of measured object 9, a curve develops on the detector array that is representative for the design of the surface 8. Because of this, in addition to a distance of the measured object 9 to the sensor device 1, a profile of the measured object can be determined. It is also possible to dispense with the determination of the distance if only the determination of the profile is of interest, i.e. the change in distance along the illumination line. If the measured object moves relative to the illumination light beam, a three-dimensional structure of the measured object can be determined. In this way, for example, profiles of vehicle tires can be measured and possible damage or heavy wear of the entire tire or part of the tire can be recognized. Because of the design of the sensor device according to the invention, the entire width of the vehicle tire can be illuminated by a single illumination line, without simultaneously leading to very large sensor devices.

Figure 3:
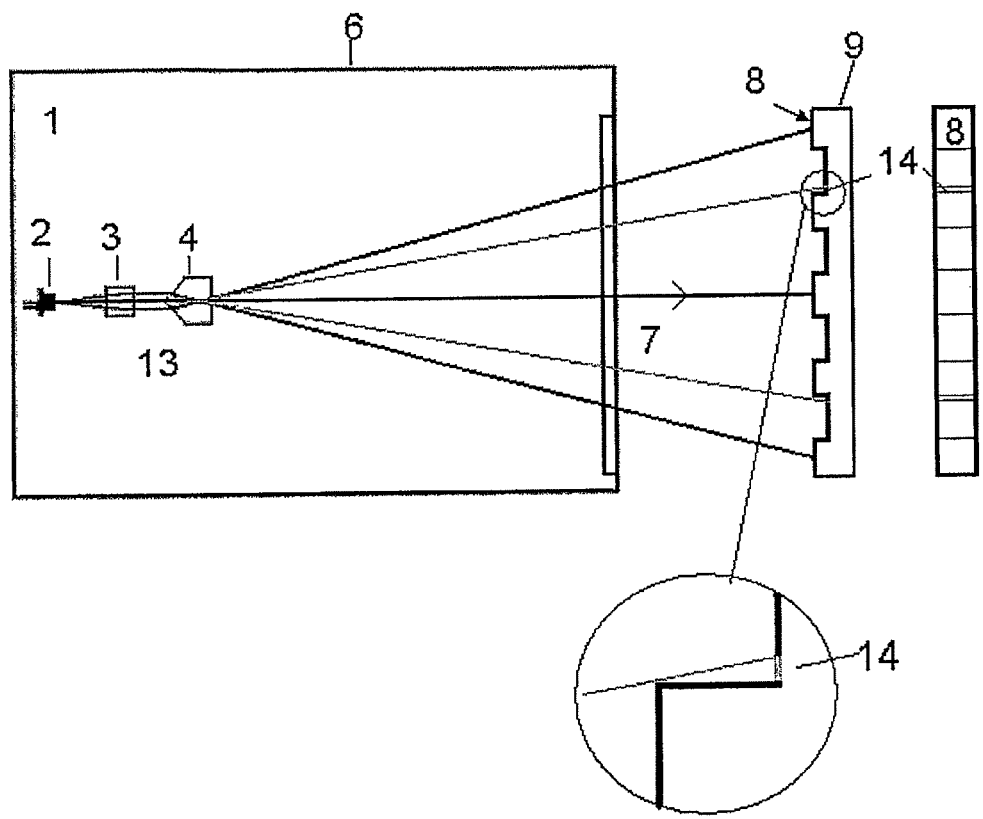
FIG. 3 shows a top view of a sensor device which—differently from a sensor device according to the invention—uses a divergent illumination light beam.

FIG. 3 shows a sensor device with—in contrast to a sensor device according to the invention—a divergent illumination beam. The action of the shadowing effects can be recognized. As with the arrangement according to FIG. 1 or 2, a structured measured object 9 is illuminated with an illumination light beam. Differently from the sensor device according to the invention, however, the illumination light beam does not leave the sensor device as an essentially parallel light beam, rather it has a divergent beam path. As can be seen with reference number 14 in an enlargement at the lower edge of the illustration, there is great shadowing on edges of the structured surface, i.e. individual areas of the surface cannot be illuminated. This occurs especially with large fanning angles which are taken into account to make the sensor optics smaller. In comparison to this, the shadowing can be clearly reduced by an almost parallel illumination (FIG. 2).

In the sensor device according to the invention, the Fresnel lens in the diverging beam channel offers especially the following advantages:

1. Reduction of shadowing effects on structured surfaces due to an almost parallel beam path of the illumination.
2. Uniform back scatter distribution because of the almost constant incident light angle over the entire line length of the illumination light beam.
3. Miniaturization and weight saving of the housing 6 with small operating distance due to the flat Fresnel lens, which is most advantageously designed of plastic.

In addition, the device according to the invention can be used without homogenization of the illumination light beam, i.e. the individual beam bundles in, the illumination light beam are not mixed. The light from the light source is formed by the first optics from a concentrated bundle to a line-shaped bundle even before the Fresnel lens. The Fresnel lens is an independent optical component and is located at a distance from other optical components. Special measures for protection of the Fresnel lens are not necessary since the Fresnel lens is located on the inside of the housing behind a window. Special measures and especially designed light sources are not necessary. Because of the use of a collimator and a line-generating optics, the light beam generated by the light source can be formed very freely. Each of the individual optical components can be optimized and adjusted. Due to the fanning of the illumination light beam by the line-generating optics 4, the Fresnel lens can be designed so that it is relatively narrow, so that in turn weight savings are achieved here. In addition, a very compact construction form of the sensor device can be achieved.

With respect to other advantageous designs of the device according to the invention, to prevent repetitions, reference is made to the general section of the description as well as to the attached claims.

Finally it must also be explicitly stated that the exemplary embodiment of the device according to the invention described above serves only as an explanation of the claimed teaching, but this teaching is not limited to the exemplary embodiments.

The invention claimed is:

1. A device for non-contacting measurement of a distance or of a profile of a measured object, comprising:
   a light source configured to generate an illumination light beam for illuminating the measured object; and
   a detector configured for detection of a portion of the illumination light beam reflected at the measured object,
   wherein in a beam path of the illumination light beam, a first optics and a second optics are arranged, whereby the illumination light beam is first expanded in a fanning plane arranged parallel to a propagation direction via the first optics and after that is made approximately parallel via the second optics, wherein in directions perpendicular to the fanning plane substantially no expanding takes place, wherein the illumination light beam illuminates the measured object in a linear manner, wherein the first optics comprises a collimator and a line generating optics, and wherein the line-generating optics is arranged in the area of a focal point of the second optics for generating a parallel line bundle.

2. The device according to claim 1, wherein the second optics comprises a Fresnel lens.

3. The device according to claim 2, wherein the Fresnel lens is manufactured of plastic.

4. The device according to claim 2, wherein the Fresnel lens is designed as a cylindrical Fresnel lens.

5. The device according to claim 2, wherein the grading of the Fresnel lens is designed essentially perpendicular to the fanning plane of the illumination light beam.

6. The device according to claim 1, wherein the illumination light beam passes the second optics essentially unchanged in directions perpendicular to the fanning plane.

7. The device according to claim 1, wherein the detector has a detection optics and wherein the detection optics contains, in addition to the classic imaging elements, a cylindrical lens or a combination of several cylindrical lenses or is characterized as a diffractive or holographic element.

8. The device according to claim 1, wherein an approximately parallelized received beam path is provided for.

9. The device according to claim 1, wherein the device is mounted in a housing that allows the illumination light beam to leave the housing through an outlet window, wherein the portion of the illumination light beam reflected on the measured object goes through an inlet window into the housing and wherein the outlet window and inlet window are designed separately from the first optics and the Fresnel lens.

10. A method for non-contacting measurement of a distance or a profile of a measured object, comprising the steps of:
    generating a light beam via a light source,
    expanding the light beam, via a first optics, in a fanning plane arranged parallel to the propagation direction, thus forming an expanded light beam,
    parallelizing the expanded light beam, via a second optics, thus forming an approximately parallel illumination light beam, and
    illuminating the measured object with the illumination light beam, wherein a portion of the illumination light beam reflected on the measured object is detected by a detector for determining the distance or the profile,
    wherein in directions perpendicular to the fanning plane substantially no expanding takes place, wherein the illumination light beam illuminates the measured object in a linear manner, wherein the first optics comprises a collimator and a line generating optics, and wherein the line-generating optics is arranged in the area of a focal point of the second optics for generating a parallel line bundle.

11. The method according to claim 10, wherein for adjusting the device, the distance between the first optics and the second optics is adjusted.

* * * * *